3,269,851
GELATIN-BONDED OPEN-FIBERED COLLAGENOUS MASSES AND METHODS OF MAKING

Shu-tung Tu, Ipswich, Mass., assignor to United Shoe Machinery Corporation, Flemington, N.J., and Boston, Mass., a corporation of New Jersey
No Drawing. Filed Nov. 29, 1963, Ser. No. 327,094
8 Claims. (Cl. 106—125)

This application is a continuation-in-part of my co-pending applications, Serial No. 59,837 entitled, "Open-Fibered Collagenous Masses and Methods of Making," filed October 3, 1960, and Serial No. 94,999 entitled, "Processes of Making Leather-Like Materials," filed March 13, 1961, and both now abandoned.

This invention relates to a new leather-like material and process of making it.

Leather possesses outstanding toughness, abrasion resistance, and high water take-up and release characteristics, together with a desirable appearance and feel. However, the skins from which leather is prepared are irregular in shape, thickness and physical characteristics so that there is a high percentage of waste.

Efforts have been made to develop a sheet material from the fibers of skins by swelling the skins, mechanically breaking down the swollen skins, and forming the resulting pasty material into sheets, filaments, or threads. These products have had a hard, non-fibrous feel, as might be expected due to the glued-together nature of the product.

The United States patents to Highberger and Whitmore Nos. 2,934,446 and 2,934,447 issued April 26, 1960, and entitled, "Collagen Fiber Masses and Methods of Making the Same," and a copending application in the name of Shu-Tung Tu, Serial No. 26,399, filed May 3, 1960, and now U.S. Patent No. 3,071,483, entitled, "Manufacture of Collagen Products," disclose the manufacture of leather-like materials by combining undissolved collagen fibers with an aqueous solution of collagen and precipitating the dissolved collagen. Excellent products are obtained but problems and expense are involved in dissolving collagen to form the collagen solution.

It is an object of the present invention to form a skin-like or leather-like material from readily available materials and to provide a process which avoids the problems and expense of the hitherto known processes.

To this end, and in accordance with a feature of the present invention, a skin-like or leather-like material is formed by combining an aqueous solution of at least partially hydrolyzed collagen with undissolved collagen fiber and precipitating and insolubilizing the hydrolyzed collagen in binding relation to the existing fibers to form an open-fibered sheet. The resulting sheet resembles leather and possesses equivalent strength, and water take-up and release characteristics, as well as the appearance and feel of the leather. The term "open-fibered" is used herein to designate a structure in which the fibers are not plastered together or cemented into a horny or parchment-like translucent mass but are held only at spaced points throughout their lengths and retain their individuality to a considerable extent as do the fibers in leather.

Collagen fibers are considered to be polymers of a basic collagen monomer which is understood to comprise coiled chains and to have the dimensions of about 14 A. x 3000 A. and a molecular weight of about 300,000 to 360,000. The various forms of collagen occurring in in vitro fibrogenesis are explained in terms of the orientation and forms of aggregation possible with such monomers under the influence of different environments. It appears that acid-extractable soluble collagen from such materials as calf-skin is made up largely of this collagen monomer which has been designated "tropocollagen."

Such soluble collagen is quite a different material from the products of which the best known forms are termed gelatin obtained by the more drastic treatment of such collagen sources as hides and skins from mature animals and bone. That is, collagenous material in these sources is believed to be held together by numerous links between adjacent collagen fibrils, these cross links being of a covalent nature. These crosr links prevent the entering into solution of the collagenous material under the conditions which are effective for solution of the less cross linked collagen present in the skin of young animals such as calf-skin. More drastic treatment of these cross linked collagen materials than that used to extract tropocollagen involves the use of greater acidity and higher temperatures and is understood to break up the collagen molecule into fragments through hydrolysis. The fragments are shorter molecules of relatively low molecular weight. As noted above, the length of one of the coiled polypeptide chains of the tropocollagen molecule is about 3,000 A. and the molecular weight of the chain is about 120,000. It has been determined from measurement of the average chain length and molecular weight of fractions of commercial gelatin that the gelatin molecules are multichain and in general have a contour length less than 3,000 A. The component chains of the gelatin molecules are believed to be held together by covalent bonds (see Courts and Stainsby "Recent Advances in Gelatin and Glue Research," at page 100, published by Pergamon Press, London, New York, Paris and Los Angeles). The molecules of gelatin, since they are not collagen monomers or tropcollagen, are not reconstitutable by procedures of the above referred to patents to form typical structured collagen fibers or fibrils from tropocollagen.

The further disclosure of the invention will refer to the water soluble fragmented collagen derivative as "gelatin" for purposes of convenience; but it is to be understood that the procedures and products may use other water soluble collagen material obtained from collagen raw material by breaking of the chain of the basic collagen molecule. For example, materials obtained by controlled hydrolysis of collagen raw material using less severe conditions than the normal gelatin making process, and materials such as glue, in which the collagen is more degraded than in gelatin, may be used.

In my process gelatin molecules are converted into fibrous insoluble material through the action of poly-functional linking agents such as the chrome complex, certain other inorganic salts such as those of aluminum, ferric iron, titanium and zirconium, and organic cross linking agents such as the aldehydes and certain complex hydroxyl-containing compounds such as the "Syntans" and vegetable tannins (tannic acid).

The following experiment is evidence of the ability of such agents to link the collagen fragments which make up gelatin into a fibrous material. A 2% solids aqueous solution of a commercial gelatin derived from an acid precursor was heated to 40° C. and a ⅓ basic chrome sulfate solution containing 1% chromium calculated as $Cr_2O_3$ and 2% by weight of sodium formate was added to provide a weight ratio of chromium, calculated as $Cr_2O_3$, to solid gelatin of about 2 to 100. The chrome solution when added had a pH of about 4. After the chrome solution and the gelatin solution had been thoroughly mixed, the mixture was cooled to room temperature and then poured into a large volume of acetone. A fibrous mass was formed. This mass was pressed into a fibrous mat which was plasticized with an acetone solution containing 4% glycerin and 4% oleic acid. The mat was then dried to remove the acetone. The dried fibrous mat withstood boiling in water without shrinking for more than five minutes and thus demonstrated the typical hydrothermal stability of chrome tanned leather.

I have discovered that aqueous solutions of water-soluble hydrolyzed collagen materials, particularly the gelatins, which are closely related chemically and physically to collagen may be combined with existing collagen fibers in a manner to impart to the collagen fibers the ability to join firmly together into a strongly knit open-fibered structure when the collagen derivative is precipitated from solution in association with such fibers.

A product closely approaching natural leather is prepared according to the present invention by forming a matrix of precipitated fragmented collagen, e.g. gelatin, in vitro, in association with existing native collagen fiber. The cross linking of the collagen fragments apparently both bonds the fragments together into chains and serves as a bonding agent permanently uniting these chains to the natural existing collagen fiber to give a product having excellent strength characteristics.

Association of the linked collagen fragments with native collagen fiber may be achieved in a variety of ways as by incorporating a gelatin solution into a collagen fiber mat which may have been prepared by deposition from an aqueous slurry, by air deposition, or by textile procedures such as carding. The gelatin solution may be incorporated with the fibers before forming the fibers into a sheet of intertwined fibers or after the sheet has been formed. The cross linking agent may be added before or after the sheet is formed.

The mixing method employed in the patents of Highberger and Whitmore referred to above provide a superior degree of contact between the existing collagen fibers and the gelatin molecules, which insures the degree of association which is effective to provide strong interbonding. In this procedure the relatively small molecule size of the collagen fragments permit deep penetration into the fiber bundles of the native collagen fiber. This desired deep penetration is best achieved by mixing at higher temperatures of the order of 40° C. at which the viscosity of the solutions is low.

Precipitation of the fragmented collagen molecules is advantageously effected by an agent capable of reacting with both the existing collagen fibers and with the fragmented collagen, e.g. gelatin. Metallic tanning agents, particularly the chrome tanning agents, have been found particularly desirable since they precipitate and insolubilize the gelatin, establish a chemical link between the collagen fibers and the precipitated gelatin, and tan the combination to protect it from putrescence and to impart heat shrinkage resistance.

The collagen fiber materials constituting one of the elements of the new leather-like sheet is prepared by teasing animal skin into individual fibers or into bundles of fibers. A procedure for separating the skin into fibers is described in more detail in the Highberger et al. Patent No. 2,934,447 referred to above, and in United States Patent to Frederick C. Merriam and Robert A. Whitmore, issued November 13, 1962, and entitled "Preparation of Hide Fiber." As described more fully in the patents, improved separation of the fibers is attained by lightly tanning the skin material, preferably with formaldehyde or glutaraldehyde to the extent of insuring combined tanning agent of from about 0.1 to about 1%, thereafter placing pieces of the lightly tanned material in water in a machine comparable to a paper beater where it is beaten into individual fibers or small clumps of fibers, and finally dewatered, these steps being carried out under controlled pH conditions. It is possible to separate skin into its fibers without the light tanning and to use other procedures than beating in the presence of water to separate the skin into its fibrous constituents, and it is to be understood that collagen fibers from any convenient source may be used.

The collagen derivative used as another important component of the new material may be derived from any of the conventional sources of collagen, such as skin, bone, hoofs, etc., by processes known per se in which the collagen is partially degraded or hydrolyzed to bring it to a condition in which its molecular size is smaller and its solubility in water increased. Because of their ready availability, the gelatins will normally be used, and either the type A gelatin, which is derived from acidified hide material, or the type B gelatin, which is derived from alkali treated source material, may be used.

Combination of the existing collagen fibers with the collagen derivative is effected by preparing an aqueous solution of the collagen derivative and bringing the fibers and solution together under such conditions as to insure uniform distribution of the collagen derivative material on the existing fibers. It is preferred to use solutions having high solids concentrations within the limits imposed by viscosity considerations. That is, the concentration must not be so high as to increase the viscosity to interfere with mixing and/or penetration of the solution into the mass of fibers. Aqueous solutions containing from about 5% to about 25% gelatin, preferably about 10%, have been used. Moderately elevated temperatures from about 25° C. up to about 50° C. reduce the viscosity of such solutions and facilitate mixing and impregnation.

One method for accomplishing association of the fibers and collagen derivation involves the introduction of the fiber and of a collagen derivative solution, preferably at moderately elevated temperature, into a suitable mixer, which may be a worm-type mixer, in which the components are worked and squeezed to distribute the solution uniformly through the fiber mass. This mixture will then be spread into a sheet by suitable procedures known per se involving rolling, extrusion, pressing, or the like. The formed sheet will set on gelling of the solutions. Cooling to from below room temperature preferably to about 5° C. will shorten the time required for this action.

Mixtures suitable for conversion to sheet form by this method may have a solids content (combined fiber and collagen derivative) in the range of from about 5% to about 25% by weight, preferably about 12% based on the weight of the mix. The collagen derivative may be present to the extent of about 2% to about 20% by weight, preferably about 10% to 12% based on the combined weight of fibers and collagen derivative.

A sheet or mat of existing collagen fibers for combination with a solution of gelatin for the manufacture of a skin-like or leather-like material according to another aspect of the present invention may be formed in a variety of ways. A preferred procedure involves the formation of a free-flowing aqueous slurry or collagen fibers and depositing the slurry on a porous or foraminous surface and withdrawing water through the surface to form a wet layer of intermeshed or mated collagen fibers. Fluid slurries for formation of a sheet by this procedure may have a fiber solids content up to about 6% by weight based on the weight of the slurry, but about 2% by weight is preferred.

Many different types of apparatus are available for use in forming a sheet from the fibrous slurry. The apparatus may vary from a simple screen or perforated plate to equipment for continuous sheet formation in which pressure or vacuum may be used to increase the rate of removal of liquid from the slurry. Water is usually removed from the fibers to give a water content of 80% to 85% by weight based on the total weight of the fibers and water, but it is possible, by use of pressure, to reduce the water content to only 50% by weight.

A sheet of intermeshed fibers is formed by first disposing on a foraminous plate or screen, a layer of porous paper such as filter paper or blotter paper. Thereafter there is spread or distributed on the exposed surface of the porous paper a fluid slurry of collagen fibers in an aqueous medium. After introduction and spreading of the slurry on the surface of the porous paper, air pressure may be applied to the surfacse of the fluid slurry. The pressure forces the liquid from the slurry through the porous paper and foraminous plate. Further treating fluid may be supplied to the fiber layer left after expression of the water.

For this operation, air pressure is released, and the liquid treating agent is spread or allowed to flow over the entire surface of the layer of fibers deposited there. Air pressure is then applied to force this additional liquid treating material into the fibrous layer. Ordinarily the liquid treating agent operates to drive before it and displace residual water or other liquid portions of material within the fibrous layer. A variety of treating agents in liquid form may thus be used to apply successive treatments to the deposited fibrous layer. Thus a gelatin solution may first be impregnated into a deposited fibrous layer; then a tanning agent solution may be forced into the fibrous layer, and finally additional treating agents including, fat liquor, coloring agents and dehydrating agents may be forced into the fibrous layer.

The deposited fibrous layer and the porous paper on which it was formed may be stripped apart, the stripped-off fibrous layer being then subjected to any further mechanical treatment as needling or the like to which it is desired that the product be subjected.

Where desired, an open fabric, such as a netting, having openings preferably from about 1/32 to 3/16 inch across, may be incorporated as a part of the collagen fiber sheet, for example by disposing the fabric on the porous paper sheet. It has been found, particularly where pressure or vacuum is used, that significant quantities of fibers are forced through the openings in such fabric so that after removal of the sheet, the fiber which has passed through the openings gives a surface appearance to the sheet resembling Turkish toweling. The effect of this is to orient fibers perpendicular to the plane of the sheet to give increased resistance of the sheet to delamination. The projecting fibers combine with the main surface of the sheet in subsequent treatment so that a smooth-surfaced skin-like or leather-like final product is obtained. The fabric also makes handling of a wet sheet a simpler operation and may contribute tensile strength to the final product.

Ordinarily an aqueous solution of gelatin is distributed on the layer of fibers while the layer is still on the foraminous surface. The solution of gelatin may contain from about 0.5% to about 10% by weight of gelatin and may be warmed, e.g., to about 30° to 70° C. to reduce its viscosity. The solution may be drawn or forced into the layer by vacuum or pressure for intimate association with the fibrous material. The fibers in the wet layer are in a desirable condition both individually and in their relation to each other for effective association with the solution distributed on the layer. It has been found that the solution displaces the water remaining in the fiber layer without significantly disturbing the relation of the fibers. Sufficient of the solution of gelatin is used to provide in the final sheet from about 2% to about 20% by weight, preferably about 4% to about 12% by weight based on the combined weight of fibers and gelatin from the solution. After impregnation the fiber layer may be caused to set up by gelling of the solution, as by cooling, or by precipitation of the gelatin from solution.

Alternative procedures for forming sheets of collagen fiber include deposition of dry collagen fibers in a layer, preferably under conditions giving random orientation of the fibers. Various textile procedures, such as carding, garnetting, and the like may be used. These textile procedures may give unidirectional orientation of the fibers, and in this event, it may be desirable to employ more than one layer of fibers with the direction of the fibers of one layer at an angle to the direction of the fibers in an adjoining layer.

Dry collagen fibers tend to withdraw water from aqueous solutions of gelatin. This may result in development of a more concentrated and more viscous body of solution on the surface of layers formed from dry fibers which might interfere with penetration of the solution into the interior of the layer. To avoid this difficulty, it may be found desirable to spray or otherwise introduce water into such layer before contact with the gelatin solution and/ or to use a more dilute solution than that used in treating the layers formed by wet procedures. A further procedure may involve impregnation of the fiber layer by using an emulsion or dispersion of a gelatin solution in a non-aqueous continuous phase.

Precipitation of gelatin in fibrous insoluble condition linking the existing fibers may be effected by polyfunctional linking agents. Preferred agents effective in aqueous solution to precipitate gelatin or collagen from solution include the water soluble compounds of trivalent and hexavalent chromium. My copending application Serial No. 26,399 referred to hereinabove describes solutions which have been found useful in the present relation and sets forth in detail pH conditions, masking agents concentrations and proportions of solutions useful in the present relationship. As described in that application, the compounds formed by partially neutralizing chromic salts such as chromic chloride and chromic sulfate give very desirable results. The reaction of these chromic salts with alkaline material brings the salt first to the stage referred to by tanners as "one third basic" and then to higher basicity up to as high as about 50% basic with an optimum of 40% for the present purpose. Use of the basic chromium solution not only precipitates gelatin from solution but also tans and bonds the precipitated gelatin and existing collagen fibers to give a desirable relatively high "shrink temperature."

Combination of gelatin or collagen with the chrome tanning agent occurs in the pH range of about 3 to 5.5 depending on the amount of masking agent. The pH of the chrome solution and/or the material containing dissolved gelatin are adjusted so that when the solution and material are brought together, the resulting pH is in this range.

A masking or complexing agent such as the ammonium and alkali metal salts of formic acid and of hydroxy carboxylic acids, e.g., sodium tartrate, sodium gluconate, and sodium phthalate, may be used with the chromic salts, these agents being capable of forming complex molecules with the products formed by partial neutralization of the salts. The complex compounds thus formed are relatively stable so that the pH of the solution may be raised to as high as about 5 without precipitation of chromic oxide. The masking agent may be used in the ratio of from about ½ to about 4 parts by weight to one part by weight of the tanning agent calculated as $Cr_2O_3$. For use in the process of the present invention, the solution is ordinarily adjusted by addition of an alkaline material such as sodium hydroxide to a pH of from about 3 to about 5. It is to be noted that with the complex solution, the pH of the solution may require as much as two days to stabilize, during which time additional alkaline material may be added to achieve the desired final pH value.

Many alternatives are available in the procedures for effecting this precipitation. A sheet formed from collagen fibers and collagen derivative, which has been set into shape-retaining condition by gelling of the solution of gelatin, may be immersed in or otherwise contacted with an aqueous solution of the tanning agent in concentration and for a time sufficient to precipitate the collagen derivative and to form chemical bonds between the collagen derivative and the collagen fibers. It has been found that a treatment sufficient to give a combined chromium content of 0.2% by weight calculated as $Cr_2O_3$, based on the weight of the fibers and derivative, will precipitate the collagen derivative and effect chemical bonding. Usually this treatment is carried out in a manner giving a higher chrome content such as 1 to 4%, preferably about 2% to effect a full tanning of the sheet. Whether fully tanned or not, sheets prepared according to this procedure are strongly held together and give open-fibered skin-like or leather-like products of high strength after dehydration by solvent or other dehydration procedures.

The collagen fibers may be chrome tanned in an optional procedure before being formed into a sheet or layer. This tanning should be sufficient to give a combined chromium content of at least 0.2% by weight calculated as $Cr_2O_3$, based on the weight of the fibers and higher chrome contents such as 1% to 6%, preferably about 2%, by weight is usually provided where this procedure is used. It has been found that a layer of chrome tanned fibers deposited from an aqueous slurry drains more freely than a layer of fibers which are not chrome tanned. Also, the chrome compound carried by the fibers is available to precipitate and combine with gelatin so that subsequent chrome tanning of the sheet is unnecessary.

Chrome tanning of the collagen fibers is ordinarily carried out in an aqueous slurry of the fibers. To hold the fibers in suspension it is desirable to carry out tanning at a pH value outside the isoelectric range of the fibers. Thus, with lightly aldehyde tanned fibers, tanning is preferably carried out either on the more acid side of the range of pH 3.5 using, for example, about 0.5% of a buffering and masking agent such as sodium formate, or on the less acid side of the range at pH 4.5, for example 4% of a buffering and masking agent such as sodium formate. The chromium solutions used for tanning will ordinarily contain from about 1% to about 5%, preferably about 2% to 3% by weight of a water soluble chrome salt tanning agent, the chrome content being calculated as $Cr_2O_3$. The preferred tanning agents are the compounds formed by partially neutralizing chromic salts such as chromium chloride and chromium sulphate to the range of forming ⅓ to ½ basic, preferably about 40% basic.

When chrome tanning agent is added to a mixture of fibers and collagen derivative solution before sheet forming, it is important to insure that the reaction proceed slowly. Speed of reaction can be reduced by low pH values, by low temperatures and by the presence of masking agents and other salts. It has been found important to control the temperature of the collagen derivative and fiber mixture to which the chrome tanning agent solution is added. Too high temperature causes excessive rate of reaction of the tanning agent with the collagen derivative and fiber and produces a phenomenon best described as "ropiness" presumably due to case hardening or fiber dehydration which makes sheet formation difficult. Too low temperature causes separation of fluid from the mix and again presents difficulties in sheet formation. It has been found that these difficulties are avoided where the mixture of fibers and collagen derivative solution is cooled to a temperature in the range of from about 20° C. to about 35° C. before admixture of the solution of chrome tanning agent.

The sheet material may be dried by evaporative and/or solvent dewatering and/or freeze drying or other procedures and is treated to "plasticize" it, that is, treated with an agent which will inhibit further water bonding. Suitable plasticizers include, for example, hydrophobic oily or fatty materials such as oleic acid which may be introduced, in emulsion or solution form for example, in a methanol solution. Other "plasticizing" agents may be synthetic resinous or rubbery components which penetrate the mass and retard or prevent further water bonding. Agents falling in this latter class are natural rubber latex, butadiene acrylonitrile copolymer synthetic rubber latices in which the copolymer may comprise from about 20 to about 45% acrylonitrile, polyvinyl chloride and polyvinyl chloride-acetate latices, and in general natural and synthetic resin and rubber latices.

Sheet materials, after plasticizing, may be dried, if necsary to remove the vehicle in which the plasticizing agent was introduced and then subjected to a needling operation comparable to that described in greater detail in the copending application of Shu-Tung Tu and John H. Highberger, Serial No. 805,032, filed April 8, 1959, and now U.S. Patent No. 3,073,714 entitled "Collagen Fiber Sheet Material and Method of Making." Briefly, this needling treatment involves penetrating the sheet, as with needle points, over substantially the entire area at closely spaced points to form very small crater-shaped holes in which fibers of portions of the sheet immediately surrounding the holes have been displaced from the position in which they were prior to forming the holes. The displaced fibers have a substantial effect in resisting delamination tendencies of the sheet and also effect the "hand" of the sheet to produce a softness and flexibility comparable to that obtained with conventional leather by the technique of staking.

After the needling operation, the sheet material may be coated with a plastic deposit such as formed by spraying or brushing a fluid hardenable polymer material on the surface of the sheet into which the needles have penetrated and allowing the polymer material to harden. Further finishing operations of conventional nature, such as used in the finishing of leather, may also be used, for example, plating, pressing, embossing, and the like.

The following examples are given to aid in understanding the invention and it is to be understood that the invention is not restricted to the particular materials, proportions or procedures set forth therein:

*Example I*

Pickled split cowhide trimmings were washed and brought to a pH of 8.5 by addition of sodium hydroxide. The trimmings were cut to approximately 1" pieces and 50 lbs. of the trimmings were placed in a Hollander type paper beater with 150 lbs. of water to give a solids content of about 5%. The beater was operated for one-half hour, at the end of which time the pH was readjusted to about pH 5 and 300 cc. of 37% formaldehyde solution were added. The beating was continued for five minutes and the resulting slurry was allowed to stand for two hours, then discharged onto screens and drained overnight. The drained material was passed through rubber squeeze rolls to bring its solids concentration to about 25%. The squeezed material was put back in the beater and water added to bring the solids content in the beater to about 5%. The beater was operated for one hour with the beater blades set close to the bed plate (0.003" to 0.005" clearance) to form a slurry of separated hide fibers.

One thousand grams of the slurry were mixed with two liters of water to form a uniform dispersion of the fibers in the aqueous phase.

A layer of filter paper was spread on a screen and the slurry of the collagen fibers was introduced on top of the filter paper layer. 20 pounds air pressure was applied to the surface of the slurry to cause the water component to be expressed from the fibers. Dewatering of the slurry to form a layer of intermeshed fibers was completed in about one minute.

Air pressure was released and 300 cc. of an 0.85% solids solution of type A gelatin in water at a temperature of 45° C. was supplied to the surface of the fiber layer. Air pressure was again applied to force gelatin solution into the layer of fibers, displacing residual water in the layer.

Air pressure was released; the deposited sheet of collagen fibers with gelatin was stripped from the paper layer and the sheet was immersed in a 40% basic chrome tanning solution at pH 4 for one hour. The chrome tanning solution comprises 1% chromium calculated as $Cr_2O_3$ and 2% of sodium formate. The sheet was removed from the tanning solution, allowed to stand overnight, and was then washed in water. The washed sheet was immersed in acetone for two periods of one hour each, using fresh acetone for each immersion to effect removal of water. The sheet was then immersed in an isopropyl alcohol solution containing 4% oleic acid and 4% glycerin.

The sheet was removed from the isopropyl alcohol bath and while still damp was passed beneath a reciprocating bar carrying needles on its lower surface and the sheet was manipulated beneath the reciprocating needle bar to provide an average of about 1500 perforations in the sheet per square inch. The needles in the reciprocating bar were smooth needles comparable to those formerly used as phonograph needles, and the diameter of the holes in the sheet was found to be from about 0.1 to about 0.2 mm. when examined under a microscope. After the needling had been completed, the sheet was brushed with a 20% solids aqueous emulsion of a butadiene acrylonitrile copolymer synthetic rubber. Thereafter, the sheet was brushed with two coats of a conventional acrylic leather finish (Rohm & Haas No. 2) and was embossed after each coating using a temperature of 160° F. and a pressure of 75 tons for 15 seconds. A tough, leather-like sheet of good appearance and feel was obtained.

*Example II*

34 lbs. of pickled cowhide splits were agitated intermittently in a small tanning drum for 20 hours with a solution comprising 1400 mls. of acetic acid, 1000 grams of sodium hydroxide and 1500 mls. of 37% formaldehyde solution all dissolved in 80 lbs. of water. The splits were then drained and washed and passed through a chopper which cut the material into approximately 1 inch pieces. The chopped material was then introduced into a paper beater with additional water, bringing the beater load to 200 lbs. The beater was operated for about one-half hour to form a fibrous slurry, the slurry was discharged onto screens and drained. The drained material was passed through rubber squeeze rollers to bring its solids concentration to about 26.7% solids.

11.6 lbs. of the squeezed material was suspended in about 70 lbs. of water in the paper beater and the beater operated to form a slurry of separated hide fibers. 31 mls. of formic acid was added in portions to reduce the pH of the bath to pH 3.35. The resulting smooth slurry had a solids content of about 4%.

4300 mols of a solution containing 1% of chromium calculated as $Cr_2O_3$ and also containing 0.5% of sodium formate, and having a pH of 3.0 was added to the slurry and throughly mixed in. The mixture was allowed to stand overnight and in the morning has a pH of about 3.5.

1700 mols of slurry was formed into a sheet as in Example I. It was observed that water was expressed from the sheet more easily than from the slurry of Example I.

After formation of the sheet, 250 cc. of an aqueous gelatin solution containing 1% gelatin by weight, at a temperature of 45° C., was forced into the sheet as in Example I. The filter paper layer was stripped from the sheet of fibers and gelatin. The sheet was allowed to air dry to 200 grams. The sheet was then immersed in an acetone solution containing 4% oleic acid. Subsequent treatment of this sheet followed the procedure set forth in Example I. A tough sheet closely corresponding to leather in its properties was obtained.

*Example III*

12 lbs. of the squeezed fibrous material prepared according to Example II was suspended in 70 lbs. of water in the paper beater. 200 mls. of 0.5 N sodium hydroxide was added in portions to the circulating suspension in the paper beater and the beater operated to form a smooth fiber slurry having a pH of about 5.95 and a solids content of about 4% by weight.

4300 mls. of a tanning solution comprising 1% chromium calculated as $Cr_2O_3$ and 4% sodium formate, and having a pH of 5.0 was added to this slurry, mixed in and allowed to stand overnight. The resulting mixture had a content of 3% $Cr_2O_3$ and 12% sodium formate by weight based on the weight of the fiber. After standing overnight, the pH of the slurry was 4.8.

A sheet was formed, treated with gelatin and given further treatment following the procedure set forth in Example II.

The product was a leather-like sheet similar to those of Examples I and II, but very slightly plumper.

*Example IV*

Pickled split cowhide trimmings were washed and brought to a pH of 8.5 by addition of sodium hydroxide. The trimmings were cut to approximately 1" pieces and 50 lbs. of the trimmings were placed in a Hollander type paper beater with 150 lbs. of water to give a solids content of about 5%. The beater was operated for one-half hour, at the end of which time the pH was readjusted to about pH 5 and 300 cc. of 37% formaldehyde solution were added. The beating was continued for five minutes and the resulting slurry was allowed to stand for two hours, then discharged onto screens and drained overnight. The drained material was passed through rubber squeeze rolls to bring its solids concentration to about 25%. The squeezed material was put back in the beater and water added to bring the solids content in the beater to about 5%. The beater was operated for one hour with the beater blades set close to the bed plate (0.003" to 0.005" clearance). The slurry was then removed from the beater, drained overnight, and squeezed through rubber rollers to give a fibrous mass to about 28.2% solids having a combined formaldehyde content of 0.43% by weight.

A type A gelatin (Atlantic) with a bloom rating of 275 was dissolved in water at 45° C. to give a 10% solids solution.

1,000 grams of the 28.2% solids fibrous mass was added in 50 grams portions to 310 grams of the gelatin solution and 500 cc. of water in a jacketed worm-type mixer at a temperature of 45° C. After a short mixing there were also added 100 ml. of a sodium chloride solution containing 31 grams of sodium chloride. The mixer was cooled to 20° C. and 65 cc. of a chrome tanning solution containing 6 grams of chromium calculated as $Cr_2O_3$ and 12 grams of sodium formate were added gradually. 1,093 cc. of water were added to bring the combined fiber and gelatin solids concentration to approximately 10% and the mixer was operated to effect a thorough combination of the materials. The pH of the mixture was 4.65. After the components were thoroughly mixed, the mixture was subjected to vacuum to reduce the amount of entrapped air and other gases. The mixture was placed on a polyethylene sheet, covered with a sheet of polyethylene terephthalate and spread by rolling and working to a thickness of about 0.1". After forming the sheet, the sheet was refrigerated for one and one-half hours to reduce its temperature and cause a setting of the gelatin component. The polyethylene and polyethylene terephthalate sheets were stripped from the solidified sheet of the mixture and the sheet was then immersed in an acetone bath to effect dehydration. This immersion was repeated to give a total of three immersions using a fresh acetone each time. After removal from the last acetone bath, the sheet was immersed in isopropyl alcohol containing 4% oleic acid and 4% glycerin.

The sheet was removed from the isopropyl alcohol bath and while still damp was passed beneath a reciprocating bar carrying needles on its lower surface and the sheet was manipulated beneath the reciprocating needle bar to provide an average of about 1500 perforations in the sheet per square inch. The needles in the reciprocating bar were smooth needles comparable to those formerly used as phonograph needles, and the diameter of the holes in the sheet was found to be from about 0.1 to about 0.2 mm. when examined under a microscope. After the needling had been completed, the sheet was brushed with a 20% solids emulsion of a butadiene acrylonitrile copolymer synthetic rubber. Thereafter the sheet was brushed with two coats of a conventional acrylic leather finish (Rohm & Hass No. 2) and was embossed after each coating using a temperature of 160° F. and a pressure of 75 tons for 15 seconds.

The resulting sheet resembled natural leather in appearance and in feel and had a shrinkage temperature of about 91° C.

*Example V*

1,000 grams of fiber material prepared in accordance with procedure outlined in Example IV were combined in a jacketed worm-type mixer at a temperature of 45° C. with 300 grams of a 10% solids solution of type B gelatin (Atlantic) and 500 cc. of water. The mixture had a 10% by weight combined fiber and gelatin concentration and had a pH of about 5.1. The mixture was subjected to vacuum to remove large air bubbles and was then placed on a polyethylene sheet, covered with a sheet of polyethylene terephthalate resin and spread by rolling and working to a thickness of about 0.1″. After rolling, the sheet was chilled to a temperature of about 6° C. to cause the gelatin to set. The polyethylene and polyethylene terephtalate sheets were stripped from the set sheet of the mixture and the sheet was immersed in a ⅓ basic chrome tanning solution for one hour. The chrome tanning solution comprised 1% chromium, calculated as $Cr_2O_3$ and 2% of sodium formate. The sheet was removed from the chromium bath after one hour, allowed to stand overnight and was then washed in water. The washed sheet was immersed in acetone for two periods of one hour each, using fresh acetone for each immersion to effect removal of water. The sheet was then immersed in an isopopyl alcohol solution containing 4% oleic acid and 4% glycerin. The sheet was removed from the isopropyl alcohol solution, stetched out on a board, and fastened in stretched condition. A sample of the material taken at this time showed a shrinkage temperature of 93° C.

After drying overnight, the sheet was subjected to a needling treatment as outlined in Example IV and was then given two coats of a conventional leather finish used for the treatment of leathers for "sock liners" or shoes. The coated leather was smooth plated at 180° F. after application of each coat.

The resulting sheet material had an average tensile strength of about 2445 lbs. per square inch, a stretch of 23%, a thickness of 22 mils and showed satisfactory softness and tear resistance.

Having thus described my invention, what I claim as new and desire to secure by Letters Patent of the United States is:

1. The process for making an open-fibered leather-like material comprising the steps of bringing together into intimate admixture at a temperature of from about 35° C. to about 50° C. a mass of collagen fibers with an aqueous solution of gelatin containing from about 5% to 25% gelatin solids and in amount to give from about 2% to about 20% by weight of gelatin solids based on the combined weight of collagen fibers and gelatin, and a chromium tanning agent, providing a pH in said mass of from about pH 3 to about 4.5, reacting said chromium compound to precipitate said gelatin as an insoluble chromium compound to give a firmly bonded fibrous mass in which said collagen fibers are held in stable relationship to each other, said reaction proceeding to the extent of providing at least 0.2% by weight of combined chromium calculated as $Cr_2O_3$ based on the weight of the gelatin and fibers, and removing fluid from the mass.

2. The process for making an open-fibered leather-like material comprising the steps of bringing together into intimate admixture at a temperature of from about 25° C. to about 50° C. a mass of collagen fibers having a combined chrome tanning agent content of from about 1% to about 4% by weight calculated as $Cr_2O_3$ based on the weight of the fibers with an aqueous solution of gelatin containing from about 5% to about 25% gelatin solids and in amount to give from about 2% to about 20% by weight of gelatin solids based on the combined weight of collagen fibers and gelatin, providing a pH in said mass of from about pH 3 to about pH 4.5, reacting said gelatin with chrome in said fibers to precipitate said gelatin as an insoluble chrome compound to give a firmly bonded fibrous mass in which said collagen fibers are held in stable relationship to each other, and removing fluid from the mass.

3. The method of making a leather-like sheet material comprising the steps of mixing collagen fibers with an aqueous solution of gelatin containing from about 5% to about 10% gelatin solids at a temperature of from about 35° C. to about 50° C. to form a mixture comprising from about 2% to about 20% by weight of gelatin solids based on the combined weight of collagen fibers and gelatin solids, cooling the resulting mixture and admixing an aqueous solution containing an approximately one-third basic chromium tanning agent and about 2 parts by weight of a masking agent for the chromium tanning agent to one part by weight of said chromium compound, the chromium content of the admixed chromium tanning agent being at least 0.2% by weight calculated as $Cr_2O_3$ based on the weight of the gelatin and fibers, said mixture having a pH of from about 3 to about 5, forming said mixture into a sheet, allowing said sheet to set to shape-retaining condition, said chromium tanning agent reacting with said gelatin to insolubilize it as an insoluble chromium compound firmly to give a firmly bonded fibrous mass in which said collagen fibers are held in stable relationship to each other, and removing fluid from said sheet.

4. The process for making an open-fibered leather-like material comprising the steps of bringing together into intimate admixture at a temperature of from about 25° C. to about 50° C. a mass of collagen fibers with an aqueous solution of gelatin containing from about 5% to 25% gelatin solids and in amount to give from about 2% to about 20% by weight of gelatin solids based on the combined weight of collagen fibers and gelatin, cooling said mass to set it to shape-retaining condition, thereafter bringing the mass into intimate penetraing contact with an aqueous solution containing an approximately one-third basic chromium tanning agent, said solution of tanning agent containing from about 1% to about 5% by weight of chromium compound calculated as $Cr_2O_3$, the pH and quantity of said solution of chromium compound penetrating said mass providing a pH in said mass of from about pH 3 to about pH 4.5, reacting said chromium compound to precipitate said gelatin as an insoluble chromium compound to give a firmly bonded fibrous mass in which said collagen fibers are held in stable relationship to each other, said reaction proceeding to the extent of providing at least 0.2% by weight of combined chromium calculated as $Cr_2O_3$ based on the weight of the gelatin and fibers, and removing fluid from the mass.

5. The method for making leather-like sheet material comprising the steps of mixing collagen fibers with an aqueous solution of gelatin at a temperature of from about 35° C. to about 50° C., said solution having a solids content of from about 5% to about 25% gelatin solids and being mixed in amount to provide from about 2% to about 20% by weight of gelatin based on the combined weight of collagen fibers and gelatin, forming said mixture into a sheet, cooling said sheet to set it to shape-retaining condition, thereafter bringing the sheet into intimate penetrating contact with an equeous solution containing an approximately one-third basic chromium tanning agent, said solution of chromium compound containing from about 1% to about 5% by weight of chromium compound calculated as $Cr_2O_3$, the pH and quantity of said solution of chromium compound penetrating said sheet providing a pH in said sheet of from about pH 3 to about pH 4.5, reacting said chromium compound to precipitate said gelatin as an insoluble chromium compound to give a firmly bonded fibrous mass in which said collagen fibers are held in stable relationship to each other, said reaction proceeding to the extent of providing at least 0.2% by weight of combined chromium calculated as $Cr_2O_3$ based on the weight of the gelatin and fibers, and removing fluid from the sheet.

6. The process for making leather-like sheet material comprising the steps of providing a sheet of intertwined collagen fibers, impregnating said sheet with an aqueous solution of gelatin having a solids content of from about 5% to about 25% by weight of gelatin based on the combined weight of gelatin and collagen fibers and at a temperature of from about 35° C. to about 50° C., cooling said sheet to set it to retaining condition, thereafter bringing the mass into intimate penetrating contact with an aqueous solution containing an approximately one-third basic chromium tanning agent, said solution of tanning agent containing from about 1% to about 5% by weight of chromium compound calculated as $Cr_2O_3$, the pH and quantity of said solution of chromium compound penetrating said sheet providing a pH in said sheet of from about pH 3 to about pH 4.5, reacting said chromium compound to precipitate said gelatin as an insoluble chromium compound to give a firmly bonded fibrous mass in which said collagen fibers are held in stable relationship to each other, said reaction proceeding to the extent of providing at least 0.2% by weight of combined chromium calculated as $Cr_2O_3$ based on the weight of the gelatin and fibers, and removing fluid from the sheet.

7. A leather-like sheet material comprising an open-fibered collagenous mass comprising collagen fibers with gelatin distributed on the surface of said fibers, said gelatin being present to the extend of about 2% to about 20% by weight based on the weight of said fibers, said fibers being held in stable relation to each other by the cooperative action of said gelatin and a tanning agent bonding said fibers and molecules of said gelatin, said chromium tanning agent being present to the extent of at least about 0.2% by weight calculated as $Cr_2O_3$ based on the weight of the gelatin and fibers.

8. A leather-like sheet material comprising an open-fibered collageneous mass comprising collagen fibers with gelatin distributed on the surface of said fibers, said gelatin being present to the extent of about 2% to about 20% by weight based on the weight of said fibers, said fibers being held in stable relation to each other by the cooperative action of said gelatin and a tanning agent bonding said fibers and molecules of said gelatin, said chromium tanning agent being present to the extent of at least from about 1% to about 4% by weight calculated as $Cr_2O_3$ based on the weight of the gelatin and fibers.

References Cited by the Examiner
UNITED STATES PATENTS

| | | | |
|---|---|---|---|
| 2,748,774 | 6/1956 | Novak | 117—141 |
| 2,934,446 | 4/1960 | Highberger et al. | 106—155 |
| 3,071,483 | 1/1963 | Tu | 106—155 |
| 3,136,682 | 6/1964 | Tu | 106—155 |

ALEXANDER H. BRODMERKEL, *Primary Examiner.*

D. J. ARNOLD, *Assistant Examiner.*